United States Patent [19]

Freier et al.

[11] 4,168,120
[45] Sep. 18, 1979

[54] AUTOMATIC EXPOSURE CORRECTIONS FOR PHOTOGRAPHIC PRINTER

[75] Inventors: Jan T. Freier; Ronald B. Harvey; John Poné, Jr., all of Minneapolis, Minn.

[73] Assignee: Pako Corporation, Minneapolis, Minn.

[21] Appl. No.: 896,632

[22] Filed: Apr. 17, 1978

[51] Int. Cl.² .......................................... G03B 27/78
[52] U.S. Cl. ....................................... 355/38; 355/68; 355/77; 355/83; 355/88
[58] Field of Search ...................... 355/35, 38, 77, 68, 355/83, 88; 356/175, 202, 203, 404, 443, 444

[56] References Cited

U.S. PATENT DOCUMENTS

| | | | |
|---|---|---|---|
| 2,529,975 | 11/1950 | Smith | 96/23 |
| 3,090,289 | 5/1963 | Gundelfinger | 355/88 |
| 3,152,897 | 10/1964 | Huboi et al. | 96/23 |
| 3,184,307 | 5/1965 | Letzer | 96/23 |
| 3,232,192 | 2/1966 | Stimson | 354/31 |
| 3,245,309 | 4/1966 | Wick et al. | 355/37 |
| 3,497,611 | 2/1970 | Orthmann et al. | 355/38 |
| 3,502,410 | 3/1970 | King et al. | 355/38 |
| 3,519,347 | 7/1970 | Bowker et al. | 355/88 |
| 3,523,728 | 8/1970 | Wick et al. | 355/32 |
| 3,527,540 | 9/1970 | Bowker et al. | 250/226 |
| 3,575,508 | 4/1971 | Fergg et al. | 355/88 |
| 3,591,375 | 7/1971 | Neale | 96/23 |
| 3,612,683 | 10/1971 | Riley et al. | 355/35 |
| 3,653,759 | 4/1972 | Klein | 355/38 |
| 3,669,553 | 6/1972 | Harvey | 356/202 |
| 3,690,765 | 9/1972 | Rickard et al. | 355/68 X |
| 3,694,074 | 9/1972 | Huboi et al. | 355/38 |
| 3,708,676 | 1/1973 | Huboi et al. | 355/38 X |
| 3,709,601 | 1/1973 | Zahn et al. | 355/38 |
| 3,709,613 | 1/1973 | Zahn et al. | 356/202 |
| 3,724,947 | 4/1973 | Paulus | 355/38 |
| 3,813,158 | 5/1974 | Zahn et al. | 355/38 |
| 3,873,200 | 3/1975 | Crete et al. | 355/38 |
| 3,888,580 | 6/1975 | Amano et al. | 355/38 |
| 3,944,362 | 3/1976 | Dailey | 355/38 |
| 4,001,594 | 1/1977 | Akimoto et al. | 356/202 X |
| 4,017,179 | 4/1977 | Pone, Jr. et al. | 355/68 |
| 4,092,067 | 5/1978 | Grossman | 355/77 |
| 4,099,862 | 7/1978 | Bickl et al. | 355/38 X |
| 4,100,424 | 7/1978 | Akimoto et al. | 356/202 X |
| 4,101,216 | 7/1978 | Grossman | 355/35 |
| 4,101,217 | 7/1978 | Fergg et al. | 355/38 |

FOREIGN PATENT DOCUMENTS 1016561  1/1966  United Kingdom ................... 355/38

OTHER PUBLICATIONS

"How Does the Gretag Scanning System Work".
Journal of SMPTE, vol. 65, pp. 205-215, Apr. 1956, Bartleson and Huboi, "Exposure Determination Methods for Color Printing: The Concept of Optimum Correction Level".
Ilford Journal on Photography and the Graphic Arts, vol. 3, No. 3, pp. 17-23, 1965, Neale, "Control in Color Negative Printing".
"Gretag Color Scanning Color Printer 3140".

Primary Examiner—L. T. Hix
Assistant Examiner—W. J. Brady
Attorney, Agent, or Firm—Kinney, Lange, Westman and Fairbairn

[57] ABSTRACT

An automatic photographic printer includes a sensor system for providing density signals indicative of measured optical density of a photographic film at a plurality of defined areas of the film. Photographic films containing landscape type scenes, snow/beach type scenes, and other scenes which might be incorrectly identified as subject density failures, are identified. The identified films are excluded from receiving a subject density failure exposure correction, while the remaining films are subjected to an automatic subject density failure exposure correction which is derived from the density signals.

22 Claims, 6 Drawing Figures

AUTOMATIC EXPOSURE CORRECTIONS FOR PHOTOGRAPHIC PRINTER

REFERENCE TO CO-PENDING APPLICATIONS

Reference is made to a co-pending patent application Ser. No. 896,812 by J. Freier, R. Harvey, and J. Pone, Jr. entitled "Automatic Snow/Beach Correction for Photographic Printer", which was filed on even date with the present application and is assigned to the same assignee as the present application.

BACKGROUND OF THE INVENTION

The present invention relates to photographic printers. In particular, the present invention relates to a system for automatically identifying subject density failures and providing exposure time corrections.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the original.

A critical portion of a photographic printer is the exposure control, which controls the exposure of the photosensitive medium in order to ensure that the image on the photosensitive medium is properly exposed. The exposure control may utilize inputs from several different sources in order to determine the proper exposure. Most automatic and semi-automatic printers use large area transmission density (LATD) sensors to sample the light transmitted by the negative either prior to or during the exposure. LATD sensors measure the average density of the negative in each of three color channels, typically red, green, and blue. Control of the exposure is then determined using a method known as "integration to grey". With this technique, it is assumed that the colors of the scene in the negative will integrate to grey over the print area, since the scene will typically contain equal amounts of all three colors.

While LATD measurements result in proper exposure for the majority of all prints, there are certain classes of negatives which are misexposed by a printer if exposure is determined solely by integration to grey. One parameter in evaluating the performance of a photographic printer is the "good print yield", which is determined by dividing the number of saleable prints by the number of printable negatives. Remakes (in which the printer misexposes a negative which can be reprinted to give a saleable print) detract from the good print yield. Remakes consist of many broad failure types, which include (1) subject density failures, (2) subject color failures, (3) color failures, (4) density failures, and (5) snow scenes and beach/water scenes.

A subject density failure is a negative in which LATD generated exposure times misexpose the subject (as opposed to the background of the scene). In general, subject density failures require only a plus (+) density correction.

Subject color failures are negatives in which a predominant background color causes the printer to print the subject with an excess of the compliment color. A typical example of a subject color failure is a baby on a red rug; most printers will print the baby with unacceptable cyan color. Subject color failures typically require color correction.

A color failure negative is a negative which has both the subject and background off color in the same color. This is often caused by out of date, overheated film or as a result of incandescent or fluorescent lit scenes. Color failure negatives typically require only color correction from the exposures which could be dictated by the LATD measurements.

Density failure negatives (in which both the subject and background are over- or underexposed) involve only a density correction from the LATD generated print times.

Snow scenes and beach/water scenes may require a small minus (−) density and/or color correction.

Automatic photographic printers have been developed which include systems for recognizing subject density and subject color failure negatives. These systems generally include a density or color measuring system which provides measurements of the transmission density of the negative at defined discrete or continuous areas, as opposed to an average or integrated measurement over the entire negative (i.e. the LATD measurements). The measurements at discrete or continuous areas have been used either to modify the exposure times derived by LATD measurements, or as the sole means of exposure determination. Examples of these mechanisms are described in the following U.S. Pat. Nos. Stimson 3,232,192; Wick et al. 3,245,309; Bowker et al. 3,519,347; Wick et al. 3,523,728; Harvey 3,669,553; Rickard et al. 3,690,765; Huboi et al. 3,694,074; Zahn et al. 3,709,613; Paulous 3,724,947; Huboi et al. 3,790,275; Zahn et al. 3,813,158; Crete et al. 3,873,200; Amano et al. 3,888,580; Dailey 3,944,362; Pone, Jr. et al. 4,017,179.

Photographic printer systems which have been commercially available and which include systems for automatically identifying subject density failure negatives and providing exposure corrections include the Pako Mach II printer, the Kodak 2610 printer, the Agfa 7560 printer with ADK, and the Gretag 3140 printer.

SUMMARY OF THE INVENTION

The present invention is an improved system for providing an automatic exposure correction for subject failure density type negatives. In a preferred embodiment, the exposure corrections are derived from density signals indicative of measured optical density of a film at a plurality of defined areas of the film. The exposure corrections are a function of the difference between a modified maximum signal and a modified minimum signal. The modified maximum signal is indicative of an average of more than one of the density signals from generally centrally located defined areas of the film, while the modified minimum signal is indicative of an average of more than one of the density signals from essentially all of the defined areas of the film.

The preferred exposure correction system has been found to be particularly effective even when a relatively small number of density signals are available. In fact, performance has been superior to or at least comparable to systems in which many more density measurements are made.

The automatic exposure correction for subject density failures is particularly effective when the printer automatically identifies negatives which exhibit some characteristics of subject density failure, but which would print incorrectly if a subject density failure correction were applied. Examples of these type of negatives include landscape type scenes and snow/beach type scenes. In a preferred embodiment of the present invention, therefore, negatives of these types are identified through optical measurements and are excluded from receiving an automatic subject density failure exposure correction. All other negatives are subject to the automatic subject density failure exposure correction, which may range from zero to a very large plus (+) density correction.

DETAILED DESCRIPTION OF THE PREFERRED EMBODIMENTS

Figure 1:
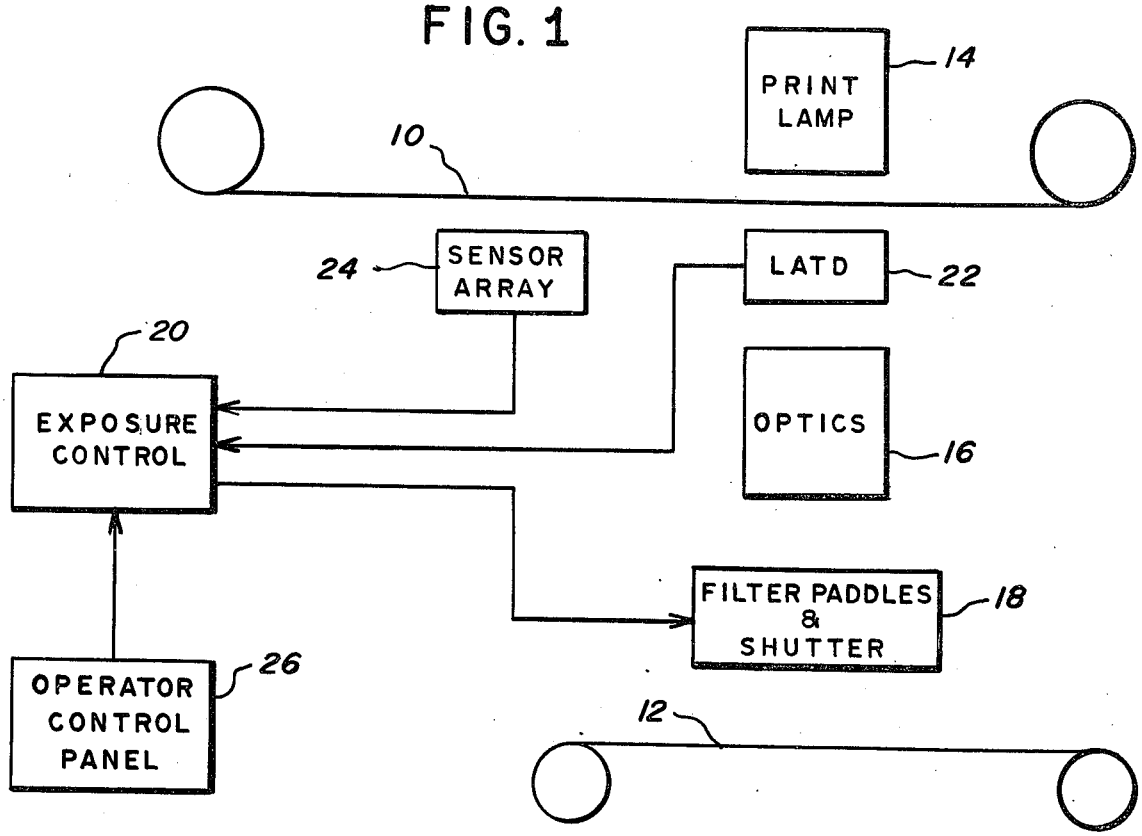
FIG. 1 is a block diagram of a photographic printer.

The present invention is an effective system for classifying and identifying photographic negatives containing various types of scenes and determining the amount of density correction, if any, the negatives require. FIG. 1 illustrates a photographic printer system which has been used in one successful embodiment of the present invention. In this printer, an image contained in film 10 is printed onto photosensitive paper 12. Light from print lamp 14 is passed through a frame of film 10 and is focused by optics 16 onto an appropriate portion of paper 12.

The exposure time during which paper 12 is exposed to the image from film 10 is determined by the position of filter paddles and shutter 18. The filter paddles typically include a subtractive filter for each color channel (red, green, and blue). Filter paddles and shutter 18 are controlled by exposure control 20.

In the embodiment shown in FIG. 1, exposure control 20 receives input signals from large area transmission density (LATD) sensors 22, from density or color sensor array 24, and from operator control panel 26. In a preferred embodiment of the present invention, the snow/beach correction requires the LATD sensor signals from LATD sensors 22 and density measurements at individual points on the film sensor array 24. If sensor array 24 is a color sensing array, LATD sensors may not be required, and the signals from sensor array 24 may be used in place of the LATD signals for all exposure control functions.

Figure 2:
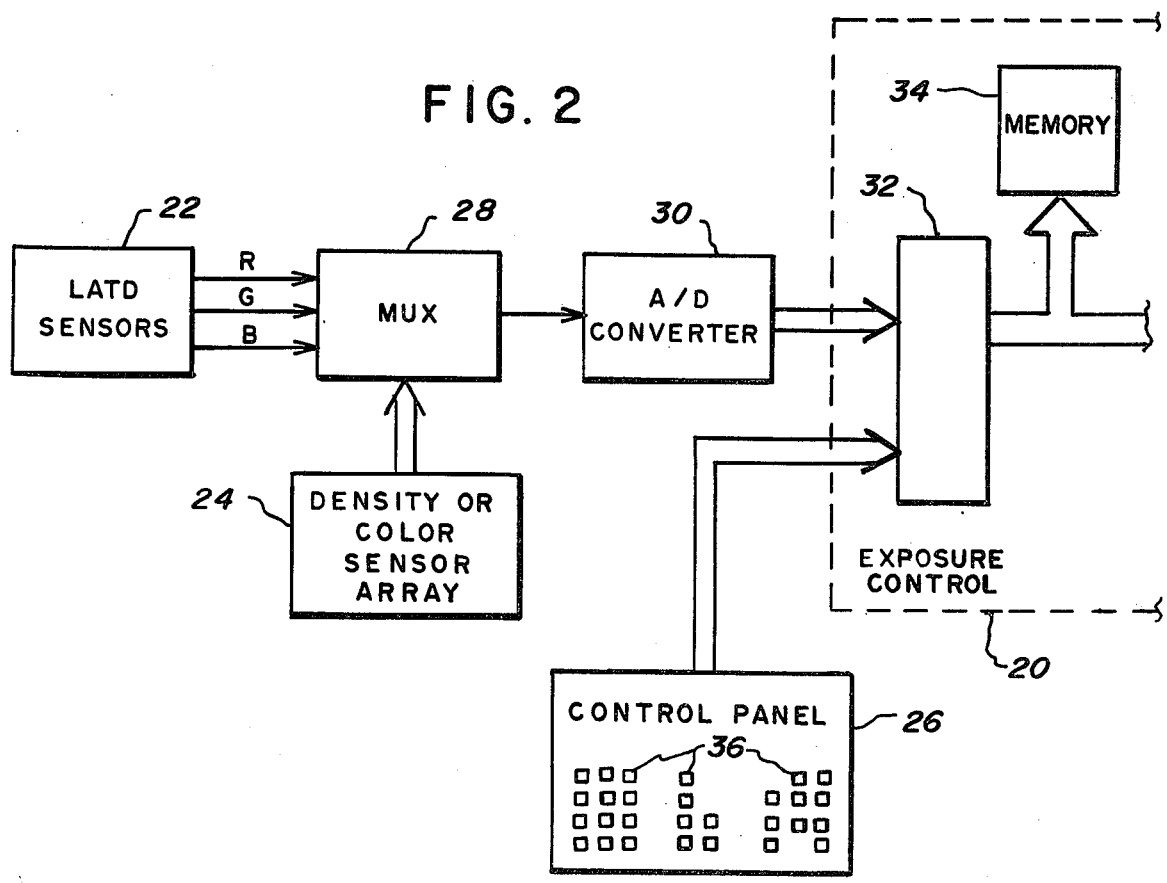
FIG. 2 is a more detailed block diagram of a portion of the photographic printer of FIG. 1.

FIG. 2 shows a more detailed view of a preferred embodiment of a portion of the printer shown in FIG. 1. In FIG. 2, the red, green, and blue signals from LATD sensors 22 and the signals from sensor array 24 are multiplexed by multiplexer 28, converted to digital signals by A/D converter 30 and supplied to a digital processor such as microprocessor 32 of exposure control 20. Also shown in FIG. 2 is memory 34, which is associated with microprocessor 32 and preferably includes both read only memory (ROM) and read/write memory storage. Other portions of the exposure control 20 are not shown in FIG. 2 because they are not critical to the description of the present invention. In one preferred embodiment, exposure control 20 is of the type described in the copending patent application entitled "Exposure Time Control" by F. Laciak and J. Pone, Jr., Ser. Number 848,736 filed Nov. 4, 1977, and assigned to the same assignee as the present application.

FIG. 2 also shows a control panel 26 which includes a keyboard having operator-controlled keys or buttons 36. The operator may enter various control and correction signals into exposure control 20 by means of the various buttons 36.

Before discussing in detail the operation of the present invention, a brief discussion of the relationships used in one particular photographic printer for deriving exposure times from LATD signals and correction button values is appropriate. It should be recognized that the following discussion is but one possible technique by which exposure times and exposure corrections are derived. The present invention may be used in conjunction with other systems in which red, green, and blue exposure times are derived from density measurements, and in which density measurements at a plurality of individual points on the negative are made.

Output voltage of the sensor (either an LATD sensor or sensor of array 24) is directly proportional to light intensity on the sensor.

$$I = K_p V \qquad \text{Eq. 1}$$

The definition for negative density, $D_n$, is $$D_n = -\log_{10} T = \log_{10}(1/T) \qquad \text{Eq. 2}$$

where T=transmission and T=1 represents totally transmitting. Calling $V_O$ a reference intensity/voltage level $$T = V/V_O = I/I_O \qquad \text{Eq. 3}$$

Thus, $$D_n = \log_{10} V_O - \log_{10} V \qquad \text{Eq. 4}$$

In the embodiment described in detail in this application, the following relationship is used to derive individual print times with slope correction $$t = t_r \, 10^{S(D_n - D_{nr})} \qquad \text{Eq. 5}$$

$t$ = exposure time  $t_r$ = reference time
$S$ = slope factor  $D_n$ = negative LATD
$D_{nr}$ = reference negative LATD The following relationship between an LATD sensor voltage V and exposure time t, therefore, can be shown $$\log_2 t - \log_2 t_r = S(\log_2 V_r - \log_2 V) \qquad \text{Eq. 6}$$

where $V_r$=LATD sensor voltage for the reference negative. Since $t_r$, $V_r$, and S are known for a particular printing setup prior to printing, $\log_2 t$ (and ultimately t) can be derived from $\log_2(1/V)$. The use of $\log_2$ values in deriving exposure times is particularly advantageous since it permits various operations which would involve multiplication or division in the linear domain to be performed as addition or subtraction operations.

Printing systems are generally based on maintaining a constant exposure for all negatives. This implies that $$E = I \, t = \text{constant} \qquad \text{Eq. 7}$$

When slope is incorporated (as in Eq. 5 above) exposure is no longer constant, and the following relationship is used:

$$I^S t = \text{constant} \qquad \text{Eq. 8}$$

A slope center is set by selecting the specific time and voltage/intensity to generate an exposure. Thus $$t\, V^S = t_0 V_0{}^S = E \qquad \text{Eq. 9}$$

A description of resulting photographic paper density, $D_p$ due to an exposure is $$D_p \approx \Gamma \log_{10} E + D_{pO}.$$

This applies in a fashion in the "linear" portion of the "D log$_{10}$E" curve. An incremental change in print density can be approximated, keeping intensity constant (since the density change is to come about due to a time change only), as:

$$\Delta D = D_2 - D_1 = \gamma \log_{10} \frac{E_{S2}}{E_{S1}} = \gamma \log_{10} \frac{t_2}{t_1} \qquad \text{Eq. 10}$$

$$\log_2 t_2 = \log_2 t_1 + \frac{\Delta D}{\gamma} \times 3.321928. \qquad \text{Eq. 11}$$

In the present invention, the automatic subject density failure correction (or "ADC") is initially determined in terms of a particular "density button" value, similar to the incremental correction buttons present on operator control panel 26. The other automatic corrections, such as corrections for snow/beach scenes may be determined in a similar manner. In this case, the correction button value is converted to a time change using the following:

$$\frac{\Delta D}{\gamma} \times 3.321928 = \qquad \text{Eq. 12}$$

$$\frac{(\text{Button Value}) (\text{Button Increment}) \times 3.321928}{\gamma}$$

This time change is added to the log$_2$t value to increase or decrease exposure time (depending upon the sign of the button value).

Figure 3:
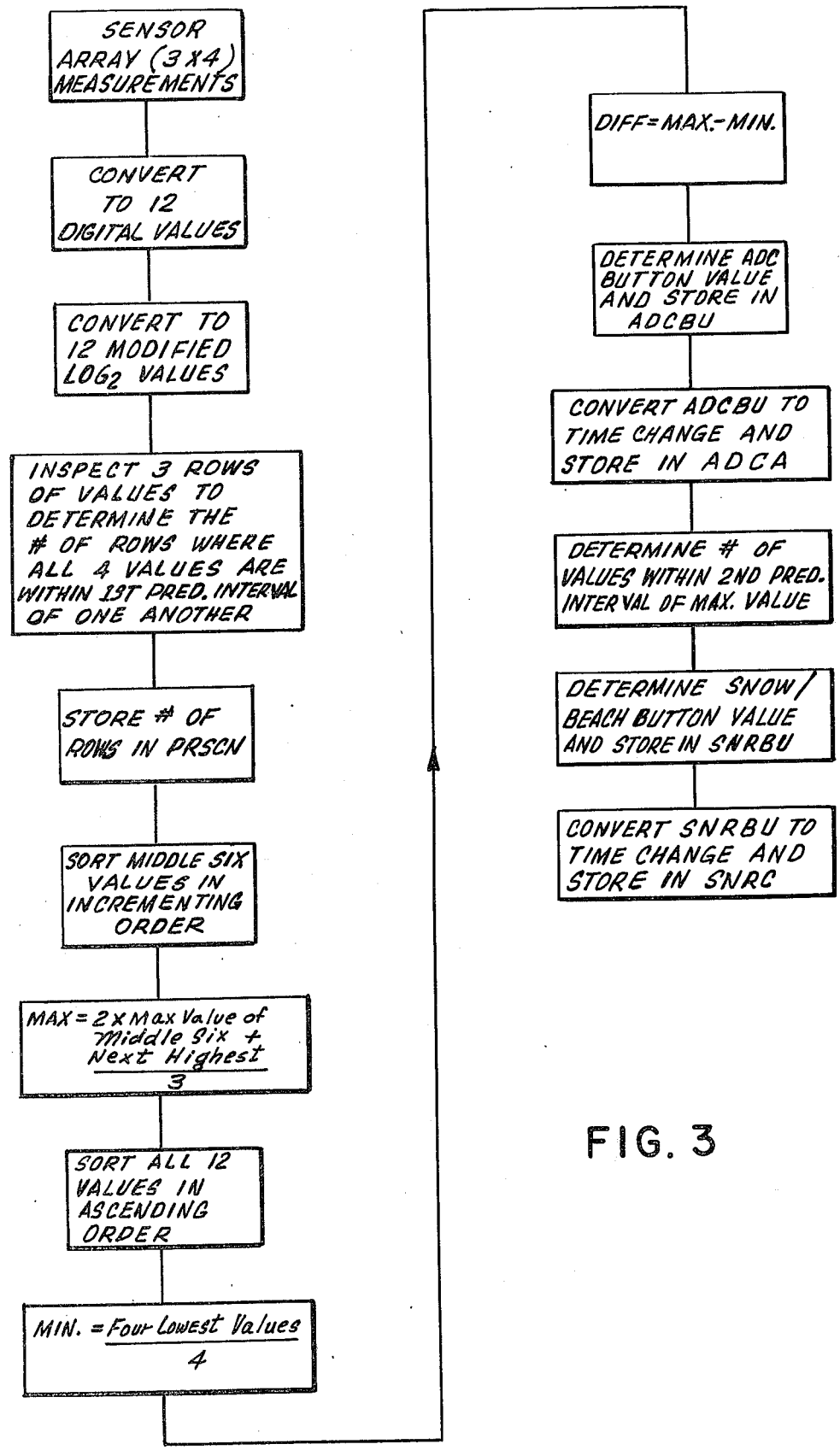
FIGS. 3 and 4 illustrate the functional steps used in the preferred embodiment of the present invention.
Figure 4:
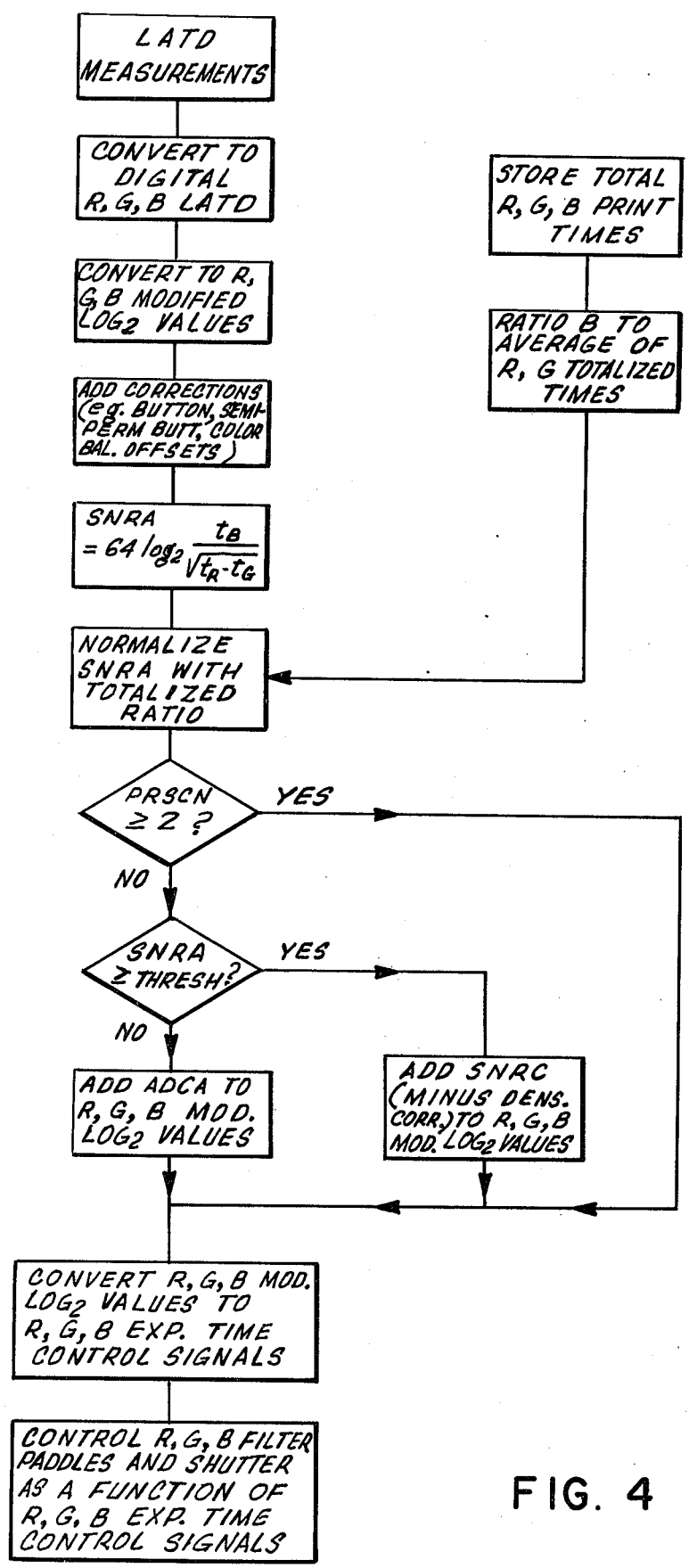

FIGS. 3 and 4 illustrate the operation of exposure control 20 in deriving appropriate automatic corrections from the sensor array measurements, and in some cases from LATD measurements as well. In particular, FIG. 3 illustrates that portion of the operation relating to the sensor array measurements. In a preferred embodiment, sensor array 24 is three rows of four sensors each of which are located at a preview gate which the negative passes prior to reaching the print gate. The operation shown in FIG. 3 is performed during each automatic exposure cycle, or immediately after a splice reject. Exposure control 20 determines the exposure corrections for the next negative to be printed.

The twelve signals from the twelve sensors of array 24 are multiplexed by multiplexer 28 and converted to digital values by A/D converter 30. These twelve digital values are converted to modified log$_2$ values which are related to the log$_2$ of the reciprocal of the digital values. In one preferred embodiment, the automatic calibration technique described in co-pending patent application Ser. No. 862,733 filed Dec. 21, 1977 by R. Laska, and assigned to the same assignee as the present application, is used to normalize the twelve modified log$_2$ values. These twelve modified log$_2$ values are multiplied by a scaling factor to yield signals representative of the densities at the twelve sensor points.

The first operation performed using the twelve log$_2$ values relates to the "prairie scan". The three rows of values are inspected to see if all four of the values in a particular row fall within a first predetermined interval of one another. The number of rows satisfying this condition is stored in PRSCN for later use.

The next operation relates to the ADC operation, which determines the extent, if any, of the subject density failure correction required. The middle six values from the sensor array (i.e. the values from the middle two sensors of each of the three rows of sensors) are sorted in incrementing order keeping the same general six addresses. The value MAX is then determined by taking the average of two times the maximum value of the middle six values plus the next highest value of the middle six. This average value is stored in MAX. The sort flag is then set to indicate that a second sort pass should be performed. During the second sort all twelve values are sorted in ascending order. Once the sort is complete, an average of the four smallest sensor values is calculated and stored in MIN. A modified difference is then determined by subtracting MIN from MAX, and this difference is stored in DIFF.

From the value DIFF, it is possible to determine the appropriate ADC correction button value. In a preferred embodiment, the ADC correction button value is always a positive density correction button and is based upon the following relationship:

$$\text{ADC Button} = X3 \left[ \left( \frac{DIFF - X1}{X2} \right)^{X4} \right] \qquad \text{Eq. 13}$$

Where
X1+X2−1=Level for no corrections
X2=Increment for successive buttons
X3=Shaping factor multiplier
X4=Shaping factor exponent This may be achieved by means of a lookup table in which DIFF values correspond to particular ADC button values. The particular ADC button value is stored in ADCBU. ADCBU is then converted to a time change using the relationship described in Eq. 12, and the time change is stored in ADCA.

The final operation using the twelve modified log$_2$ values relates to the determination of the appropriate snow/beach correction. First, exposure control 20 determines the number of density values from sensor array 24 which fall within a second predetermined interval of the maximum density value. Based upon this number, the appropriate snow/beach button value is determined and stored in SNRBU. In a preferred embodiment in which a 3×4 sensor array is used, the button value for snow/beach correction is determined according to the following table:

TABLE 1

| # values | button |
|---|---|
| ≧9 | −3 |
| ≧4 | −2 |
| =3 | −1 |
| <3 | −0 |

It will be noted that the snow/beach correction is always a negative button correction (in contrast to the ADC correction, which is always a positive button correction).

The button value stored in SNRBU is then expanded to an equivalent negative density and converted to a time change value according to the relationship illustrated in Eq. 12. The snow/beach time change value is stored in SNRC.

FIG. 4 illustrates the operation of exposure control 20 when the negative has reached the print gate and LATD measurements have been made by LATD sensors 22. The LATD sensor signals are multiplexed by multiplexer 28 and are converted to digital values by A/D converter 30. These red, green, and blue LATD sensor values are converted to modified $\log_2$ values. Various corrections such as button corrections entered through operator control panel 26, semi-permanent button corrections, color balancing offsets, and the like are added to generate modified $\log_2$ values which are indicative of the red, green, and blue exposure times if neither ADC nor snow/beach automatic corrections are made.

Snow/beach scenes are identified by comparing the blue exposure time to the average of the red and green times. It has been found that snow/beach negatives typically have a higher ratio of blue exposure time to the average of red and green exposure times when compared to other type negatives. To facilitate these calculations in a microprocessor, the ratio was modified as follows:

$$SNRA = 64 \log_2 \frac{t_B}{\sqrt{t_R \cdot t_G}} \qquad \text{Eq. 14}$$

where $\frac{t_B}{\sqrt{t_R t_G}} \approx \frac{t_B}{\left(\frac{t_R + t_G}{2}\right)}$ as long as $t_R \approx t_G$ From this calculation, a snow ratio (SNRA) value is derived. Because SNRA is derived using $\log_2$ values, the SNRA value differs from a simple time ratio. For example, a time ratio of 1 (i.e. the blue exposure time is equal to the average of the red and green exposure times) yields an SNRA value of zero. A time ratio of 2 gives an SNRA value of 64 and larger time ratios yield SNRA values which are larger than 64.

In some cases, it is advantageous to "normalize" the SNRA prior to determining whether the negative is in fact a snow/beach scene. The SNRA, as it is originally derived, assumes that the printer is operating at synchronized printing times on a normal negative. If this is the case, then the SNRA ratio can be defined strictly as the blue time to the average of the red and green times. In some cases, however, the printer does not print to totally synchronized times. This can occur, for example, because over a large sample of negatives the red time is not equal to the green time or is not equal to the blue time. To adjust for this deviation from synchronized printing, the printer of the present invention preferrably stores totals of all of the red, green, and blue times over a large number of prints. A totalized average ratio of blue time to red and green times is then taken, and this value is stored for use in normalizing SNRA. Each time an SNRA ratio is calculated, the value is modified or normalized by the value derived from the totalized average ratio. It is this modified or normalized SNRA ratio which is then used to identify negatives containing a snow/beach scene.

As shown in FIG. 4, if the prairie scan data meets a condition which indicates that the negative is a landscape type scene, then neither the snow/beach correction nor the ADC correction is applied; instead, the printer uses the LATD derived exposure times with no automatic corrections. This is the case even is the SNRA ratio would appear to indicate a snow/beach type scene, and even though an ADC correction may have otherwise been applied. The prairie scan overrides both the snow/beach and ADC automatic corrections.

Assuming that the prairie scan does not indicate a landscape scene, the SNRA is compared to a threshold value, and if SNRA exceeds the threshold, the snow/beach correction stored in SNRC is added to the modified $\log_2$ values. In practice, an SNRA threshold in the range of about 30 to about 70 has typically been found to be useful in identifying snow/beach scenes.

In the event that the negative is not a landscape negative and not a snow/beach scene type negative, the time change stored in ADCA is added to the modified $\log_2$ values. This value ranges, in a preferred embodiment, from no time change (corresponding to a zero button correction) to a time change corresponding to a +9 density button correction. In all cases, the time change stored in ADCA is either zero or a positive exposure time change.

As shown in FIGS. 3 and 4 in the present invention, the ADC correction is made only if the negative has not been identified as a landscape or a snow/beach scene. Since the ADC correction is the largest correction which can be made, all of the negatives are presorted for other types (such as landscapes and snow/beach scenes) first before allowing the ADC correction to be applied.

In order to demonstrate the effectiveness of the system of the present invention, a series of tests were performed in which a printer (labeled "MicroMach") which used the present invention was compared with the performance of a Pako Mach II printer with ADC, an Agfa 7560 printer with and without ADK, and a Kodak 2610 printer. In each case, the printer was required to operate on 428 negatives of 35 mm size. Of these 428 negatives, 415 were printable, while 13 were "not printable" (i.e. negatives that could not be corrected to yield a saleable print). Efforts were made to achieve identical color balance for each of the printers.

The prints produced by the various printers were compared on a side-by-side basis and divided into the categories of saleable and not saleable by an experienced printer operator. In general, the criteria of saleability rested on appropriate detail in the subject. The non-saleable prints were sub-divided into categories which reflect the failure mode causing non-saleability (i.e. subject failures, snow scense, etc.). For the saleable prints, no further subdividing was attempted; all saleable prints were considered equal with no attempt to rank which was the better print. TABLE 2 illustrates the results of the testing.

The "First Run Print Yield" is the number of saleable prints divided by the number of printable negatives. This percentage ranged from a low of 79% (Agfa 7560 without ADK) to a high of 86.5% (Agfa 7560 with ADK) for the four machines tested.

Another figure of merit ("Q") was defined to give a dimensionless number accounting for all modes of printer failure (the First Run Production Yield is not impacted by the number of waste prints). Q is equal to the saleable prints divided by the sum of skipped printable negatives, remakes, and waste prints. Q values for the four machines ranged from 3.2 (Agfa 7560 without ADK) to 5.7 (MicroMach). An advantage of this method of judging printer performance is that it directly relates to printer profitability. A Q of 5 means that 5 out of 6 negatives will be printed profitably on the printer in question. A disadvantage of the method is that it is not sensitive to negatives printed incorrectly by a printer, but still saleable. A side-by-side comparison of prints could conceivably demonstrate that the printer having higher profitability actually has more prints which are not printed to the optimum print times and therefore turns out work which subjectively is of lower quality.

The attached analysis indicates that the MicroMach (which used one embodiment of the present invention) and the Agfa 7560 with ADK had approximately equal First Run Print Yield. The Kodak 2610 and Pako Mach II with ADC are 3% and 5% lower respectively. The Q values are highest for the MicroMach, croMach, and the Agfa 7560 with ADK is second. The Kodak 2610 and Pako Mach II with ADC are tied for third and the Agfa 7560 without ADK has the lowest Q value. The above performance indicates that even though the MicroMach had significantly less data to work from, (12 points vs over 100 for Agfa 7560 or Kodak 2610), the present invention provided comparable if not superior performance.

In conclusion, the present invention is a highly advantageous system for providing automatic exposure corrections. An important advantage of the present invention is that the same relationship for determining the extent of automatic subject density failure correction required can continue to be used even when experience indicates that certain types of negatives do not print correctly with that particular subject density failure correction. Additional presorting of the negatives to identify those negatives which are of classes which print incorrectly with automatic subject failure density correction allows the same automatic subject density failure correction to be used. In other words, if experience indicates that other types of negatives other than those containing landscape and snow/beach scenes will incorrectly obtain automatic subject density failure corrections, the present invention permits additional sorting to identify these types of negatives and excluding them from the automatic subject density failure correction.

Figure 5:
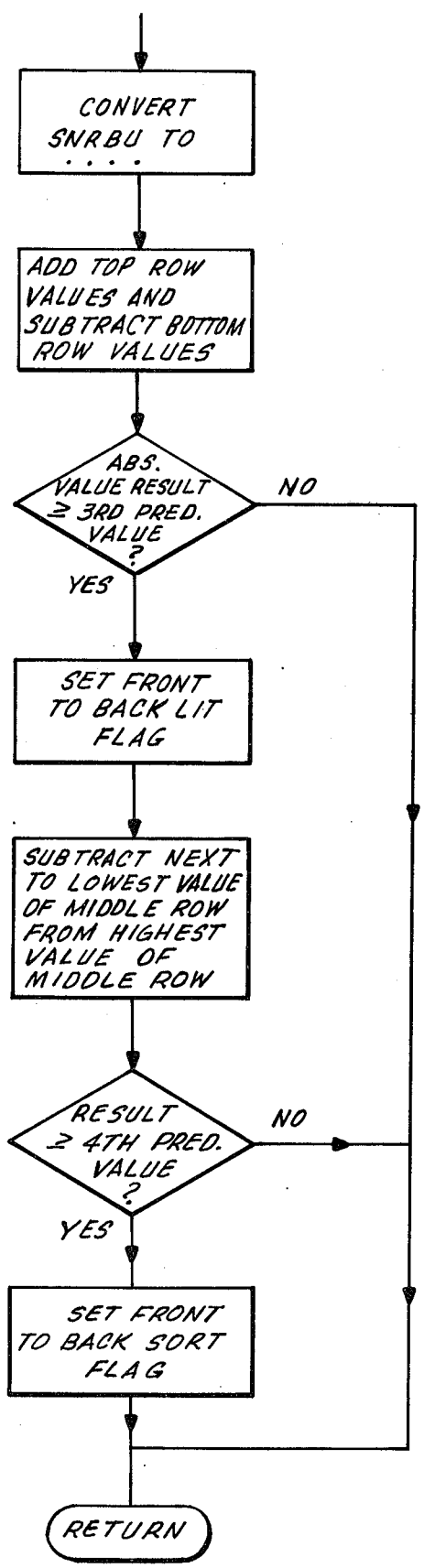
FIGS. 5 and 6 illustrate modifications to the embodiment illustrated in FIGS. 3 and 4, respectively, when identification of backlit type scenes is also included.
Figure 6:
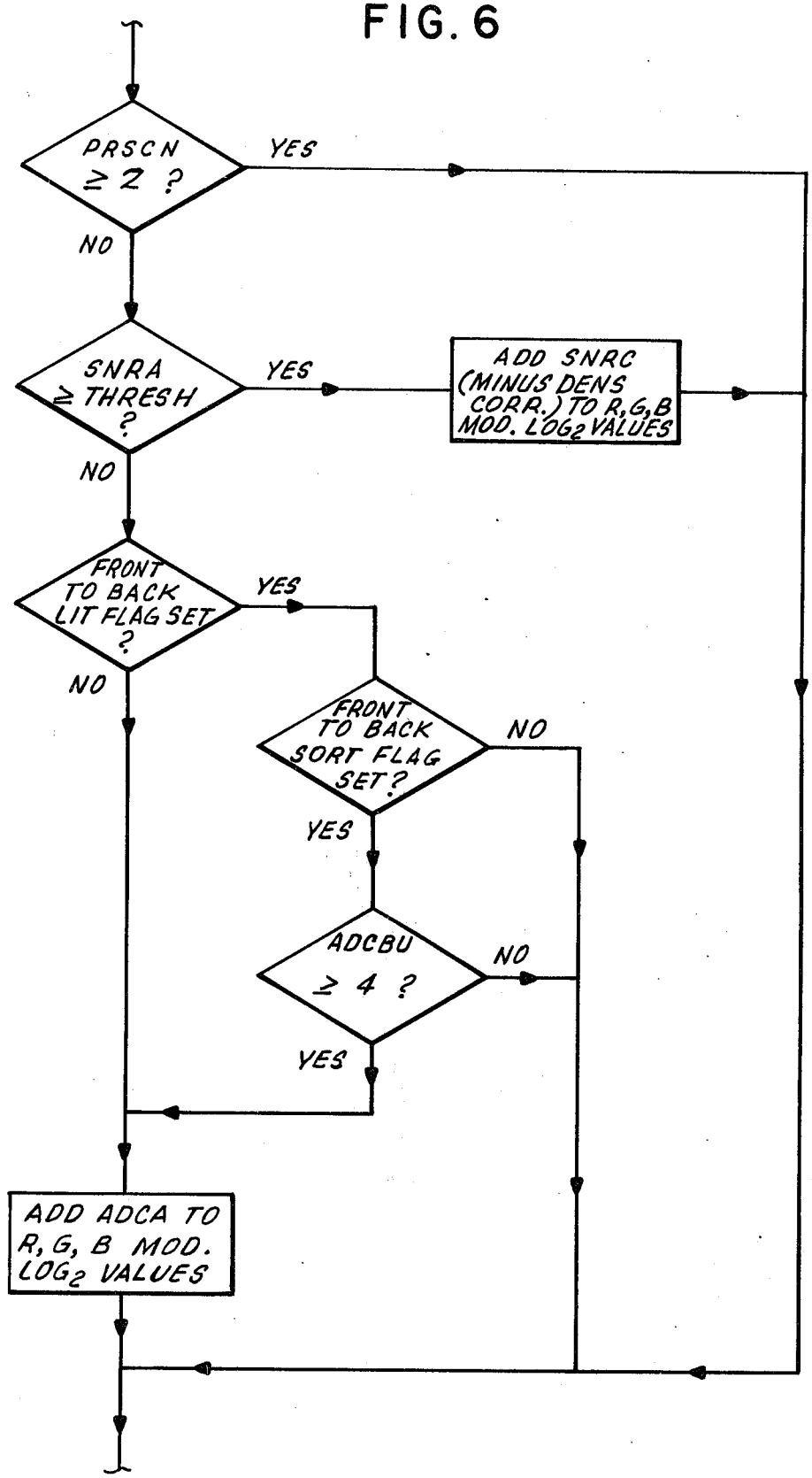

For example, in one embodiment of the present invention, the negatives are also checked to identify backlit type scenes. FIGS. 5 and 6 illustrate the modification to the operations of FIGS. 3 and 4, respectively, when backlit scene identification is also performed.

As shown in FIG. 5, the initial steps of the identification of backlit scenes may be performed after SNRBU has been converted to a time change and stored in SNRC. The exposure control 20 adds the values of the top row of sensors of sensor array 24 and then subtracts the values from the bottom row. The absolute value of this result is then compared to a third predetermined value. If the absolute value of the result is greater than or equal to the third predetermined value, a "Front to Back Lit flag" is set. Exposure control 20 then subtracts the next to lowest value of the four sensor values from the middle row from the highest value of any of the sensors of the middle row. If this result is greater than the fourth predetermined value, a "Front to Back Sort flag" is set.

When the negative reaches the print gate, the exposure time calculations from the LATC measurements are similar to those shown in FIG. 4, except that the portions relating to prairie scan, SNRA, and ADC are supplemented as shown in FIG. 6. As in the embodiment shown in FIG. 4, exposure control 20 first checks whether PRSCN is greater than or equal to 2. If the answer is yes, the negative is a landscape type scene, and is printed without an automatic subject density failure correction.

If the negative is not a landscape negative, the value of SNRA is compared to a threshold value to determine whether the negative is a snow/beach type scene. If SNRA does equal or exceed the threshold, correction contained in SNRC is added to the red, green, and blue modified $\log_2$ value and the automatic subject density failure correction is again bypassed.

If the negative is neither a landscape scene nor a snow/beach type scene, the Front to Back Lit flag is checked. If this flag is not set, the exposure control 20 proceeds to the automatic subject density failure correction and adds whatever value is contained in ADCA to the red, green, and blue modified $\log_2$ values. If, on the other hand, the Front to Back Lit flag is set, indicating a potential backlit type scene, exposure control 20 then checks to determine whether two other conditions are met. First, it checks to determine whether the Front to Back Sort flag is set. This indicates that an "ordered" middle row of sensor values exist with a significant variation in values between the highest value and the next to the lowest value of the middle row. Second, exposure control 20 checks to determine whether ADCBU is greater than or equal to 4. If both the Front to Back Sort flag is set and the ADCBU value is greater than or equal to 4, then the negative is allowed to be printed with the correction contained in ADCA. Unless these two conditions are met, the negative is identified as a backlit type scene, and is printed as a normal negative (i.e. without an automatic correction).

The use of modified maximum (MAX) and minimum (MIN) values in determining subject density failure corrections is another important advantage of the system of the present invention. This prevents a single sensor reading from erroneously indicating the presence of subject density failure. For example, a very small and intense reflection from a mirror could cause an erroneous result in some other systems which use only a single sensor reading to determine maximum and/or minimum values. Because of the use of modified maximum and minimum values, the present invention can make very large automatic subject density failure corrections (e.g. up to +9 button value) with high assurance that the corrections are in fact needed.

Although the present invention has been described with reference to preferred embodiments, workers skilled in the art will recognize that changes may be made in form and detail without departing from the spirit and scope of the invention. For example, although a specific exposure control system was described in which the signals from the sensor array and the LATD sensors are converted in a specific manner to obtain signals from which exposure times and exposure corrections are derived. Other systems may also utilize the present invention. Similarly, although the present invention is applicable to a printer having LATD sensors and a density sensor array, it may also be used in conjunction with a color scanning system which replaces both the sensor array and the LATD sensors.

TABLE 2

| | NOT PRINTABLE | | Print-ables | SPN | Good Prints (FRPY %) | REMAKES | | | | WASTE | | | | | Q |
| | O. | U. | Other | | | | SF | Snow | Den O/U | SCF | Color fail. | O/U Rej O | U | Blank | Spl | feeds | |
|---|---|---|---|---|---|---|---|---|---|---|---|---|---|---|---|---|---|
| Mach II WADC | | 13 | | 415 | 8 | 336 81% | 48 | 6 | 11[1] 4[2] 2[3]/17 | | | | 1 | 2 | | | $\frac{336}{82} = 4.1$ |
| Agfa 7560 WO ADK | | 13 | | 415 | 16 | 328 79% | 64 | 5 | 1 | 1 | | 10 | 3 | | | 2 | $\frac{328}{102} = 3.2$ |
| Agfa 7560 W ADK | | 13 | | 415 | 16 | 359 86.5% | 25 | 4 | 10[1] | 1 | | 10 | 3 | | | 2 | $\frac{359}{71} = 5.1$ |
| Kodak 2610 | | 13 | | 415 | 13 | 346 83% | 51 | 2 | 3 | | | 9 | 6 | 1 | | | $\frac{346}{85} = 4.1$ |
| Micro Mach run #B | | 13 | | 415 | 6 | 357 86% | 21 | 4 | 25[1] 2[3] | | | 3 | 1 | | | | $\frac{357}{62} = 5.7$ |

[1] Excessive ADC plus density correction
[2] Excessive minus density correction
[3] Over remake skipped by 7560

KEY:
Not printables = negatives that can not be corrected to give saleable prints, SPN = Skipped Printable Negatives, SF = Subject Failure Remake, Den O/U = Over density or under density remake, SCF = Subject color Failure, O/U Rej. = Not printable over or under negative printed as waste print, SPL = Splice printed as waste print, FRPY % First Run Print Yield = $\frac{\text{Good Prints}}{\text{Printables}}$ $Q = \frac{\text{Good Prints}}{\text{SPN + Remakes + Waste}}$

What is claimed is:

1. For use with a photographic printer, an automatic exposure correction system comprising:
   means for providing density signals indicative of measured optical density of a film at a plurality of defined areas of the film;
   means for providing a modified maximum signal which is indicative of an average of more than one of the density signals from generally centrally located defined areas of the film;
   means for providing a modified minimum signal which is indicative of an average of more than one of the density signals from essentially all of the defined areas of the film; and
   means for determining exposure corrections as a function of a difference signal indicative of the difference between the modified maximum signal and the modified minimum signal.

2. The system of claim 1 wherein the modified maximum signal is a weighted average of a density signal having a maximum value and at least one other density signal from generally centrally located defined areas of the film.

3. The system of claim 2 wherein at least one other density signal includes a density signal having a value which is next largest to the maximum value.

4. The system of claim 1 wherein the modified minimum signal is an average of a density signal having a minimum value and at least one other density signal.

5. The system of claim 4 wherein the modified minimum signal is an average of a plurality of the density signals with the smallest values.

6. The system of claim 1 wherein the means for providing a modified maximum signal comprises:
   means for sorting the density signals from generally centrally located defined areas by value;
   means for selecting the density signal having the maximum value and at least one other density signal from the sorted density signals; and
   means for deriving the modified maximum signal from the selected density signals.

7. The system of claim 6 wherein the means for providing a modified minimum signal comprises:
   means for sorting all of the density signals by value;
   means for selecting the density signal having the minimum value and at least one other density signal from the sorted density signals; and
   means for deriving the modified minimum signal from the selected density signals.

8. The system of claim 1 wherein the means for providing density signals comprises:
   sensor means for providing sensor signals indicative of measured optical characteristics of the film at the defined areas; and
   means for deriving, from the sensor signals, density signals indicative of optical density of the film at each of the defined areas.

9. The system of claim 8 wherein the means for deriving comprises:
   A/D converter means for converting the sensor signals from analog to digital sensor signals; and
   log density means for converting the digital sensor signals to logarithmic density signals.

10. A method of providing exposure corrections for a photographic printer, the method comprising:
    measuring optical characteristics of photographic films from which prints are to be made;
    identifying films containing landscape type scenes based upon the measured optical characteristics;
    identifying films containing subject density failure based upon the measured optical characteristics;
    providing subject density failure exposure corrections for films identified as containing subject density failure; and
    excluding films identified as containing landscape type scenes from receiving subject density failure exposure corrections.

11. The method of claim 10 and further comprising:
    identifying films containing snow/beach type scenes based upon the measured optical characteristics; and excluding films identified as containing snow/beach scenes from receiving subject density failure exposure corrections.

12. The method of claim 11 and further comprising:
determining a snow/beach exposure correction for films based upon the measured optical characteristics;
providing the snow/beach exposure correction to films identified as containing a snow/beach type scene; and
excluding films identified as containing a landscape type scene from receiving snow/beach exposure corrections.

13. The method of claims 10, 11, or 12 and further comprising:
identifying films containing backlit type scenes based upon the measured optical characteristics; and
excluding films identified as containing backlit type scenes from receiving subject density failure exposure corrections.

14. The method of claim 13 wherein identifying films containing backlit type scenes comprises:
determining a difference in density between a front portion and a back portion of a film;
determining a difference in density between selected central portions of the film; and
identifying the film as containing a backlit type scene if the difference in density between the front and back portions is greater than a first predetermined value, and either the difference in density between selected portions is less than a second predetermined value or the subject density failure exposure correction which the film would receive is less than a predetermined correction.

15. A method of making photographic prints from photographic films, the method comprising:
measuring optical characteristics of a film at a plurality of defined areas;
deriving density signals from the measured optical characteristics indicative of optical density of the film at the plurality of defined areas;
identifying films containing landscape type scenes based upon the density signals;
determining subject density failure exposure corrections based upon the density signals;
storing the subject density failure exposure corrections for each film;
measuring red, green, and blue densities of the film;
deriving red, green, and blue exposures for the film based upon the measured red, green, and blue densities;
printing the film without subject density failure exposure corrections if the film was identified as containing a landscape type scene;
modifying the red, green, and blue exposures as a function of the stored subject density failure exposure correction for the film if it has not already been printed; and
printing the film with the modified red, green, and blue exposures if it has not already been printed.

16. The method of claim 15 and further comprising:
determining snow/beach exposure corrections from the density signals;
storing the snow/beach exposure corrections for each film;
identifying films containing snow/beach type scenes;
printing the film without snow/beach exposure corrections or subject density failure exposure corrections if the film was identified as containing a landscape type scene;
modifying the red, green, and blue exposures as a function of the stored snow/beach exposure correction rather than the stored subject density failure exposure correction if the film was identified as containing a snow/beach type scene; and
printing the films identified as containing a snow/beach type scene and not a landscape type scene with the red, green, and blue exposures as modified by the stored snow/beach exposure correction.

17. The method of claims 15 or 16 and further comprising:
identifying films containing backlit type scenes based upon the density signals; and
printing the film without subject density failure exposure corrections if the film was identified as containing a backlit type scene.

18. A method of making photographic prints from photographic films, the method comprising:
determining densities of the films at a plurality of defined areas of the films;
determining red, green, and blue densities of the films;
deriving red, green, and blue exposures from the red, green, and blue densities;
identifying films which have densities at the plurality of defined areas which might indicate a subject density failure, but which would print incorrectly if a subject density failure exposure correction were applied; wherein identifying films comprises:
determining a first difference between totals of densities of defined areas within a front portion and a back portion of a film;
determining a second difference between densities of selected defined areas within a central portion of the film; and
identifying the film as containing a backlit type scene if the first difference is greater than a first predetermined value, and either the second difference is less than a second predetermined value or the subject density failure exposure correction which the film would receive is less than a predetermined correction;
excluding the identified films from receiving a subject density failure exposure correction during printing; and
modifying red, green, and blue exposures for all films not excluded by a subject density failure exposure correction, if any, derived from the densities at a plurality of defined areas.

19. For use with a photographic printer, an automatic exposure correction system comprising:
means for measuring optical characteristics of films to be printed;
means for identifying films containing landscape type scenes based upon the measured optical characteristics;
means for identifying films containing subject density failure based upon the measured optical characteristics;
means for supplying subject density failure exposure correction signals for the films identified as containing subject density failure based upon the measured optical characteristics, but excluding those films which are identified as containing landscape type scenes from having subject density failure correction signals supplied; and means for modifying print exposures as a function of the subject density failure correction signals.

20. The system of claim 19 and further comprising:
means for identifying films containing snow/beach type scenes based upon the measured optical characteristics; and
wherein the means for supplying subject density failure correction signals further excludes films identified as containing snow/beach scenes from having subject density failure correction signals supplied.

21. The system of claim 20 and further comprising:
means for supplying snow/beach exposure correction signals for films identified as containing snow/beach type scenes, but excluding from those films any films identified as containing a landscape type scene; and
means for modifying print exposure times as a function of the snow/beach exposure correction signals.

22. The system of claims 19, 20 or 21 and further comprising:
means for identifying films containing backlit type scenes based upon the measured optical characteristics; and
wherein the means for supplying subject density failure exposure correction signals further excludes films identified as containing backlit type scenes from having subject density failure correction signals supplied.

* * * * *